United States Patent [19]

Ueda

[11] 4,443,071

[45] Apr. 17, 1984

[54] COLLAPSIBLE TELESCOPE

[76] Inventor: Kosaku Ueda, 8 Hachioji 1-chome, Ikeda-city, Osaka 563, Japan

[21] Appl. No.: 328,266

[22] Filed: Dec. 7, 1981

[51] Int. Cl.³ .......................... G02B 23/18; G02B 7/02
[52] U.S. Cl. ...................................... 350/546; 350/250
[58] Field of Search ............... 350/140, 250, 546, 567, 350/581; 40/365; 248/460–461

[56] References Cited

U.S. PATENT DOCUMENTS 3,178,842  4/1965  Zimmerman ........................ 350/250
4,239,328  12/1980  Justice, Sr. et al. ................. 350/546

FOREIGN PATENT DOCUMENTS 710240  7/1941  Fed. Rep. of Germany ...... 350/140
922045  3/1963  United Kingdom ................ 350/546

Primary Examiner—William H. Punter
Attorney, Agent, or Firm—Birch, Stewart, Kolasch & Birch

[57] ABSTRACT

A collapsible telescope is disclosed which comprises a cylindrically-shaped main body of a quadrangular cross section defined by two long side walls and two short side walls and having folding lines at its respective angled portions and at least a lid provided via said folding line at one of opposite open-mouthed edges of one of said long side walls of said main body. An ear member is provided at one of the edges of said lid which faces against said one of the open-mouthed edges of said one of the long side walls. Preferably, an auxiliary folding line is formed to extend the full width of said one of said long side walls in a direction parallel with the width of short side walls of said main body, said auxiliary folding line being positioned in alignment with one that is developed when said two short side walls are stacked over the remaining one of said long side walls and said one of said walls is folded. Lenses fixedly secured around apertures formed in said two short side walls. The lenses include one or more eye lenses and one or more objective lenses and these eye lenses may be formed on a single-unit plate typically of plastic and the objective lenses may be similarly formed on a single-unit plate.

7 Claims, 4 Drawing Figures

COLLAPSIBLE TELESCOPE

BACKGROUND OF INVENTION

This invention relates to a telescope which is collapsible and easy to carry and protects lenses from damage when being folded.

Many improvements have been made on telescopes especially small binocular telescopes known as opera glasses: for example, focus-adjustable telescopes, collapsible telescopes, etc. The conventional telescopes are usually made of a box-like material but are still unsatisfactory in compactness, cost, etc. For the former, in the event that the box-like body is easily deformable in use, an image viewable via the telescope becomes out of focus and dull due to variations in the lens-to-lens distance. On the other hand, the collapsible telescope is usually folded in such a manner that lenses face against each other. The lenses of the collapsible telescopes are therefore in danger of damage when being carried with the viewer. Furthermore, fixtures such as rubber bushings are required for individual ones of the lenses and mounted in the body of the telescopes independently of one another with the requirement for precise relative position. The conventional telescopes of metallic material, for example, are too bulky and heavy to carry even when being folded.

OBJECT AND SUMMARY OF INVENTION

Accordingly, it is an object of the present invention to provide a collapsible telescope which is of simple and low cost structure and easy to carry with the viewer.

It is another object of the present invention to provide a telescope which is easy to assemble and disassemble and becomes flat and diminutive when being disassembled.

It is still another object of the present invention to provide a collapsible telescope which protects lenses from damage when being folded into a pocketable size.

It is yet another object of the present invention to provide a collapsible telescope through which a clear and well-defined image is viewable.

It is another object of the present invention to provide a collapsible telescope which offers a higher degree of productivity and has a design suited for mass production.

According to a preferred aspect of the present invention, the above discussed objects are accomplished by providing a collapsible telescope which comprises a cylindrically-shaped main body of a quadrangular cross section defined by two long side walls and two short side walls and having folding lines at its respective angled portions and at least a lid provided via said folding line at one of opposite open-mounthed edges of one of said long side walls of said main body. An ear member is provided at one of the edges of said lid which faces against said one of the open-mouthed edges of said one of the long side walls. Preferably, an auxiliary folding line is formed to extend the full width of said one of said long side walls in a direction parallel with the width of short side walls of said main body, said auxiliary folding line being positioned in alignment with one that is developed when said two short side walls are stacked over the remaining one of said long side walls and said one of said long side walls is folded. Lenses fixedly secured around apertures formed in said two short side walls. The lenses include one or more eye lenses and one or more objective lenses and these eye lenses may be formed on a single-unit plate typically of plastic and the objective lenses may be similarly formed on a single-unit plate.

In another preferred aspect of the present invention, said auxiliary folding line is formed on the eye lens-bearing short side wall side of said one of the long side walls. A hood is provided to extend from one edge of said one long side wall which bears the auxiliary folding line and is in contact with said short side wall bearing the objective lenses and is disposed in the direction of an extension of said one long side wall. The lid is preferably of the same cross section as that of said main body for keeping the quadrangular cross section of said main body unvaried and thus maintaining the lens-to-lens distance constant at all times.

BRIEF DESCRIPTION OF DRAWINGS

For a more complete understanding of the present invention and for further objects and advantages thereof, reference is now made to the following description taken in conjunction with the accompanying drawings, in which.

DETAILED DESCRIPTION OF INVENTION

Figure 1:
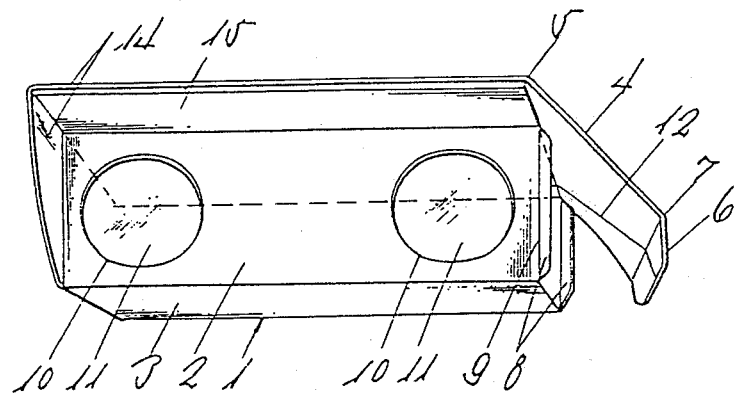
FIG. 1 is a perspective view of a collapsible telescope constructed in accordance with an embodiment of the present invention, with lids in open position.
Figure 2:
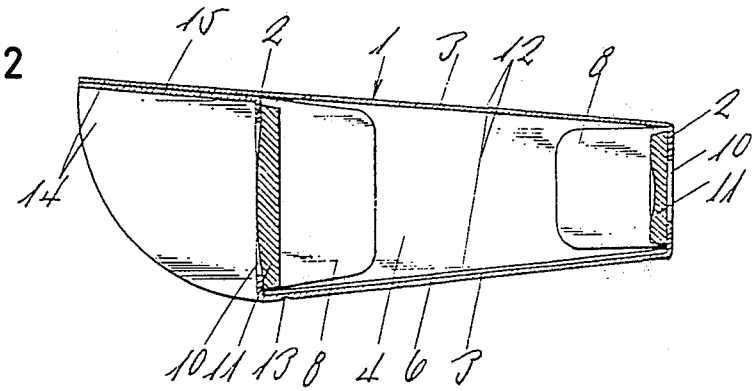
FIG. 2 is a cross sectional side view of the above illustrated telescope.

Referring first to FIG. 1, there is illustrated a cylindrically-shaped main body 1 having a quadrangular cross section. The main body may be made of a material which is sheet-like material suited for telescope, typically a carton board, a plastic sheet, a carton board with a plastic coating, a metallic coating, etc. The main body 1 is prepared by cutting a carton board into a desired small shape and reshaping the carton board into a cylindrical or box-like form through adhering or any other conventional method. In the case that the main body 1 is made of plastic material, the cylindrical main body 1 may be integrally-formed. While in the illustrated embodiment the main body 1 is of a trapezoidal cross section with the two short side walls of different heights, it is obvious that it may be of a rectangular cross section. However, the trapezoidal section is more desirable than the rectangular section for the purpose of ensuring a maximum utilization of the starting material and a minimum consumption of the material. The cross section of the main body 1 is defined by two short side walls 2 and two long side walls 3, with each of the latter being intermediate the two short side walls. Folding lines 5 are formed at the boundaries between the respective short side walls 2 and the respective long side walls 3 and in other words respective angled portions of the main body 1. A lid 4 is formed along the full length of an open-mouthed or outer edge of at least one of the two long side walls 3 with the intervention of the folding line 5, with the cross section thereof being of the same shape and size as that of the main body 1, that is, the trapezoidal cross section. This helps the main body 1 keep constantly the desired quadrangular cross section and maintains the lens-to-lens distance unvariable.

Disposed at an edge of one of long side walls of the lid 4, namely, an edge parallel with the folding line 5 of the lid 4 is an ear member 6 which may be inserted into the interior of the main body 1 when closing the open mouth of the main body 1. The lid 4 may be provided at both the opposite edges of the respective long side walls 3 (a total of two lids). Overlaps 8 are formed at all of the opposite edges of the two short side walls 2 via the folding lines but it may be eliminated in part or wholly. The overlaps 8 serve not only to back up the function of the lid 4 but to shield the interior of the main body 1 against incoming light.

The short side walls 2 are provided with apertures 10 for installation of lenses 11 including one or more eye lenses and one or more objective lenses. The lenses are adhered or otherwise secured on inner surfaces of the short side walls 2 while overlapping the apertures 10.

On the side of the long side wall 3 having the lid 4 which is close to the short side wall 2 bearing the eye lens 11 there is formed an auxiliary rectilinear folding line 12 which is oriented in a direction normal to the folding lines 5 and contiguous to the lid 4 and the ear member 6. The folding line 12 is one which is developed when both the short side walls 2A and 2B are face-down folded over the one long side wall 3A and the remaining long side wall 3B is folded over the short side wall 2A as can be seen from FIG. 3. It should be understood that the eye lenses and the objective lenses are spaced away from each other when the telescope is in a collapsed form. Preferably, the plurality of the eye lenses may be made on a single-unit plate of plastic or the like. This can be achieved through injection molding. This is true with the objective lenses. This design eliminates the need for fixtures for independent lenses as experienced in the past. The folding line 12 has a length which extends parallel and adjacent to the full length of the short side wall 2A. The folding line 12 is formed on the eye lens-bearing short side wall side of one of the long side walls.

Figure 3:
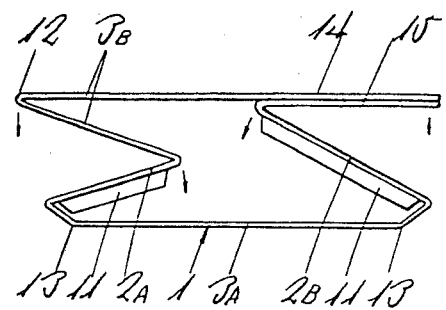
FIG. 3 is a front view of the telescope in the course of folding operation.
Figure 4:
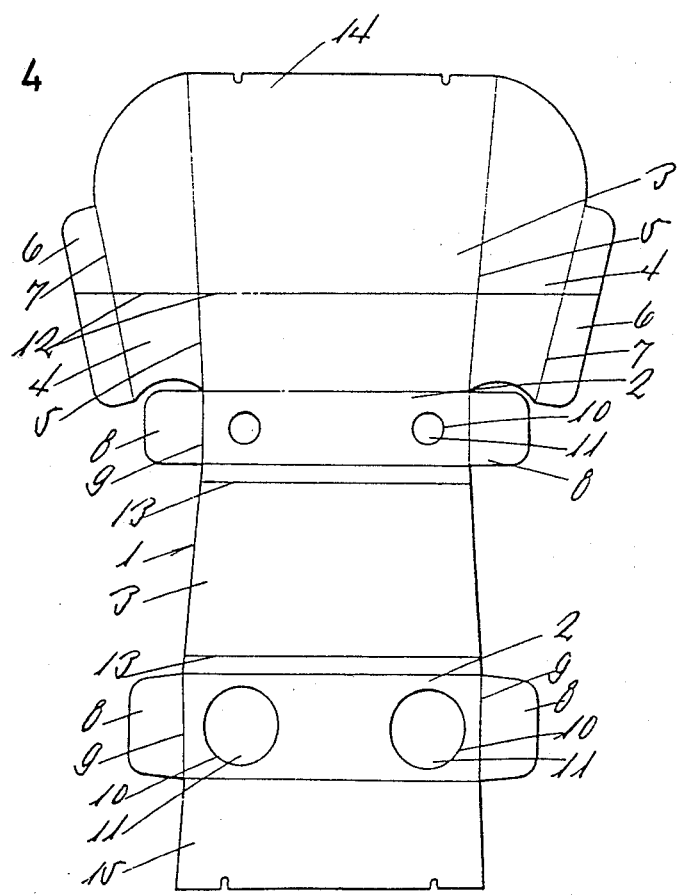
FIG. 4 is an exploded view of the telescope.

When the two short side walls 2 are of the same height, the auxiliary folding line 12 theoretically lies on one of the long side walls at a distance from the short side wall 2, which distance is equal to the height of the short side wall. When the main body 1 is of the trapezoidal cross section with a difference in height of the two short side walls as in the illustrated embodiment, the auxiliary folding line 12 adjacent the long side wall 3 is positioned at a distance with respect to the short side wall 2, which distance is equal to the sum of the height of the narrower short side wall 2 and half of the difference of the heights of the two short side walls 2. Matter-of-factly, since the lenses 11 are seated on the inner surfaces of the short side walls 2 and the height of the long side wall 3A of FIG. 3 is decreased by an extent which corresponds to the thickness of the lenses, the above distance becomes slightly longer than the theoretical width so that it is desired to position the folding line 12 while the long side wall 3 is actually folded. One or two folding lines 13 for the lenses which are parallel with the edges are formed in the long side wall 3 having no folding line, at a distance from edges contiguous to the short side wall 2 which distance corresponds to the thickness of the lenses 11. This leads to easeness of disassembly of the main body 1. However, it should be understood that the folding line 13 for the lenses is immaterial for the purpose of the present invention. In the illustrated embodiment, the auxiliary folding line 12 is formed in only one of the long side walls so that both the eye lenses and the objective lenses may be face-down folded and spaced away from each other. However, the auxiliary folding line 12 may also be formed in the lid-free long side wall 3.

Further provided at an edge of the long side wall 3 bearing the auxiliary folding line 12 adjacent to the short side wall 2 carrying the objective lenses 11 is a hood 14 which is oriented in a direction of an extension of the long side wall 3 and has a length substantially equal to the height of the short side wall 2 bearing the objective lenses 11 mounted thereon. It is preferable that the hood side of the lid 4 be as long as the hood 14. It is also preferable that the hood 14 be contiguous to the long side wall 3 without any folding line and a folding line at the boundary thereof be formed on the short side wall side. An adhesion margin 15 is provided to extend from the higher short side wall and have notches which are placed in agreement with the counterpart of the hood 14 during assembling. Such notch arrangement helps the eye lenses and the objective lenses position exactly in the same optical path and assures clearness of an image.

When it is desired to use the telescope, the long side wall 3 folded along the auxiliary folding line 12 is permitted to stretch in a rectilinear fashion and shape a cylindrical configuration. The respective ones of the overlaps 8 are bent inwardly of the main body 1 and the lids 4 are bent towards the open mouth of the main body 1. Further, the ear member 6 is inserted into the main body 1. As a result, the open mouths of the main body 1 are covered with the lids 4 and the lids 4 are fixedly seated within the main body 1 so that the main body 1 becomes undeformable in the quadrangular cross section, thus permitting use of it as the telescope. In other words, assembling the main body 1 may be accomplished in a very simple manner as a conventional box is assembled. This further avoids the occurrence of an out-of-focus image.

To disassemble the telescope, the ear member 6 of the lid 4 is removed from the main body 1 and the lid 4 and the overlapping margins 8 are brought into parallel arrangement with the long side walls 3 and the short side walls 2. As seen from FIG. 3, provided that the two short side walls 2 are folded over the long side wall 3A and the remaining long side wall 3B is bent along the auxiliary folding line 12, the walls 2 and 3 are stacked with one on the top of the other and the main body 1 becomes flat and small. The length of the whole of the main body 1 becomes substantially equal to the length of the one of the long side walls 3, because of the one long side wall 3B two-folded, and considerably smaller than that of a box folded into a parallelogram. Therefore, the telescope is reduced into a pocketable size which may be easily accommodated in a pocket of clothes or the like.

For the main body 1 with the two short side walls 2 of the different heights, it is generally impossible to collapse it into a flat parallelogram. However, according to the features of the principle of the present invention, the main body 1 may be collapsible regardless of the difference in the heights of the two short side walls 2 because the two short side walls 2 are folded over the one of the long side wall 3A and the remaining long side wall is double-folded as described previously. With the main body 1 having the height of the eye lens-bearing short side wall 2 smaller than that of the the objective lens-bearing short side wall 2, it is also possible to collapse it into a flat cross section without difficulty.

As is clear from FIG. 3, the state of the main body 1 folded in the above manner is that one of the short side walls 2 lies between the two long side walls 3 and the other of the short side walls 2 lies sandwiched between the long side wall 3 and the hood 14. In other words, all of the lenses are sandwiched and protected between the long and short side walls. The long side wall 3 or the hood 14 is positioned over the surface side of the respective lenses. Accordingly, the lenses 11 are in no danger of becoming cloudy when being touched by hands or being damaged by a foreign substance when put into a pocket. It should be noted that the lenses may be prevented from being damaged through the aid of an envelop which receives the whole of the main body 1. In this case, the hood 14 is not necessary.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A collapsible telescope comprising:
    a cylindrically-shaped main body of a quadrangular cross section defined by two long side walls and two short side walls and having folding lines at its angled portions,
    at least a lid provided via at least one of said folding lines at one of opposite open-mouthed edges of one of said long side walls of said main body,
    an auxiliary folding line formed to extend the full length of said one of said long side walls in a direction parallel with the length of said short side walls of said main body, said auxiliary folding line being positioned in alignment with a folding line which is developed when said two short side walls are stacked on said remaining one of said long side walls and said one of said long side walls is folded, and
    lenses fixedly secured around apertures formed in said two short side walls.

2. A collapsible telescope as set forth in claim 1 wherein said main body is of a trapezoidal cross section.

3. A collapsible telescope as set forth in claim 1 wherein said main body is made of a carton board.

4. A collapsible telescope comprising:
    a cylindrically-shaped main body of a quadrangular cross section defined by two long side walls and two short side walls and having folding lines at its angled portions,
    at least a lid provided via at least one of said folding lines at one of opposite open-mouthed edges of one of said long side walls of said main body,
    an ear provided at one of the edges of said lid which faces against said one of the open-mouthed edges of said one of the long side walls of said lids,
    an auxiliary folding line formed to extend the full length of said one of said long side walls in a direction parallel with the length of said short side walls of said main body, said auxiliary folding line being positioned in alignment with a folding line which is developed when said two short side walls are stacked on said remaining one of said long side walls and said one of said long side walls is folded, and
    lenses fixedly secured around apertures formed in said two short side walls.

5. A collapsible telescope as set forth in claim 1 wherein said lenses include one or more eye lenses and one or more objective lenses, with said eye lenses mounted on one of said short side walls and the objective lenses mounted on the remaining short side wall.

6. A collapsible telescope as set forth in claim 1 wherein said auxiliary folding line is formed on the eye lens-bearing short side wall side of said one of the long side walls.

7. A collapsible telescope as set forth in claim 1 futher comprising a hood provided to extend from one edge of said one long side wall which bears the auxiliary folding line and is adjacent to said short side wall bearing the objective lenses, wherein said hood is disposed in the direction of an extension of said one long side wall.

* * * * *